(12) United States Patent
Moore

(10) Patent No.: US 7,111,403 B2
(45) Date of Patent: Sep. 26, 2006

(54) HEAD FOR LINE TRIMMING APPARATUS

(76) Inventor: Mark R. Moore, 400 Bagdad Rd., Westlake, LA (US) 70669

( * ) Notice: Subject to any disclaimer, the term of this patent is extended or adjusted under 35 U.S.C. 154(b) by 0 days.

(21) Appl. No.: 10/137,025

(22) Filed: Apr. 30, 2002

(65) Prior Publication Data

US 2003/0200662 A1  Oct. 30, 2003

Related U.S. Application Data

(63) Continuation-in-part of application No. 09/645,140, filed on Aug. 24, 2000, now Pat. No. 6,401,344.

(60) Provisional application No. 60/154,952, filed on Sep. 21, 1999.

(51) Int. Cl.
*A01D 34/52* (2006.01)
*A01D 34/73* (2006.01)

(52) U.S. Cl. .................. 30/276; 30/347; 56/12.7; 56/294; 56/295

(58) Field of Classification Search .................. 30/276, 30/347; 56/294, 12.7, 295
See application file for complete search history.

(56) References Cited

U.S. PATENT DOCUMENTS

| | | | |
|---|---|---|---|
| 2,291,975 A | 8/1942 | Minero | |
| 2,608,043 A | 8/1952 | Berdan | |
| 2,793,485 A | 5/1957 | Emmons | |
| 2,867,960 A | 1/1959 | Stiles et al. | |
| 2,938,323 A | 5/1960 | Livingston et al. | |
| 2,942,397 A | 6/1960 | Clark | |
| 3,014,333 A | 12/1961 | Clark, Jr. | |
| 3,130,793 A | 4/1964 | Allegretti | |
| 3,444,674 A | 5/1969 | Huff et al. | |
| 3,474,608 A | 10/1969 | Frick | |
| 3,559,742 A | 2/1971 | Rogillio, Sr. | |
| 3,587,749 A | 6/1971 | Sauer | |
| 3,664,102 A | 5/1972 | Reber | |
| 3,708,967 A | 1/1973 | Geist et al. | |
| 3,759,020 A | 9/1973 | Simmons | |
| 3,774,379 A | 11/1973 | Mizohata et al. | |
| 3,826,068 A | 7/1974 | Ballas et al. | |
| 4,035,912 A | 7/1977 | Ballas et al. | |
| 4,043,037 A | 8/1977 | Okamoto et al. | |
| 4,047,299 A | 9/1977 | Bair | |
| 4,054,992 A | 10/1977 | Ballas et al. | |
| 4,062,114 A | 12/1977 | Luick | |

(Continued)

*Primary Examiner*—Allan N. Shoap
*Assistant Examiner*—Jason Prone
(74) *Attorney, Agent, or Firm*—Schultz & Associates, P.C.

(57) ABSTRACT

A head for a line trimming apparatus includes a body member and a detachable cover that may include a replaceable insert for connecting the head to a drive shaft of a line trimming apparatus. The body member includes opposed openings and a filament-receiving channel for inserting an elongated flexible cutting filament into the head for retention thereon. A spring-biased clamp is supported on the body member and is engageable with the filament portion residing in the channel to releasably retain the filament connected to the head. An actuator button projects through an opening in the body member and is operable to be pressed to cause the clamp to release forcible engagement with a filament so that the filament may be removed and replaced. In one embodiment the clamp and actuator are an integrally formed part and the filament projects through openings formed in spaced apart arms of the clamp member. In embodiments, the clamp and actuator members are separate parts that are mounted for sliding movement in the body member. Coil springs are operable to bias the clamp members of the embodiments into forcible engagement with the filament.

33 Claims, 10 Drawing Sheets

U.S. PATENT DOCUMENTS

| | | |
|---|---|---|
| 4,062,115 A | 12/1977 | Lee |
| 4,065,913 A | 1/1978 | Fisher et al. |
| 4,089,114 A | 5/1978 | Doolittle et al. |
| 4,097,991 A | 7/1978 | Proulx |
| 4,190,954 A | 8/1978 | Walto |
| 4,112,653 A | 9/1978 | Ballas et al. |
| 4,145,809 A | 3/1979 | Proulx |
| 4,182,100 A | 1/1980 | Letter |
| 4,104,797 A | 3/1980 | Ballas |
| 4,199,926 A | 4/1980 | Petty |
| 4,200,978 A | 5/1980 | Irelan et al. |
| 4,203,212 A | 5/1980 | Proulx |
| 4,224,784 A | 9/1980 | Hansen et al. |
| 4,229,882 A | 10/1980 | Chartier |
| 4,236,312 A | 12/1980 | Foster et al. |
| 4,244,103 A | 1/1981 | Snarr |
| 4,259,782 A | 4/1981 | Proulx |
| 4,268,964 A | 5/1981 | Moore |
| 4,271,594 A | 6/1981 | Kilmer |
| 4,271,595 A | 6/1981 | Rahe |
| 4,285,128 A | 8/1981 | Schnell et al. |
| 4,287,709 A | 9/1981 | Lowry et al. |
| 4,290,200 A | 9/1981 | Lombard |
| 4,295,324 A | 10/1981 | Frantello et al. |
| 4,301,642 A | 11/1981 | Thurber |
| 4,312,178 A | 1/1982 | Callahan |
| 4,335,510 A | 6/1982 | Close et al. |
| 4,341,060 A | 7/1982 | Lowry et al. |
| 4,343,139 A | 8/1982 | Lowry et al. |
| 4,362,007 A | 12/1982 | Kennedy et al. |
| 4,389,836 A | 6/1983 | Lowry et al. |
| 4,411,069 A | 10/1983 | Close et al. |
| 4,411,126 A | 10/1983 | Lowry et al. |
| 4,412,382 A | 11/1983 | White, III |
| 4,428,183 A | 1/1984 | Lowry et al. |
| 4,442,659 A | 4/1984 | Enbusk |
| 4,446,680 A | 5/1984 | D'Alessandro |
| 4,463,544 A | 8/1984 | Carsello et al. |
| 4,512,143 A | 4/1985 | Jimenez |
| 4,531,350 A | 7/1985 | Huthmacher |
| 4,566,189 A | 1/1986 | Muto |
| 4,571,831 A | 2/1986 | White, III |
| 4,586,257 A | 5/1986 | Rittenhouse |
| 4,587,800 A | 5/1986 | Jimenez |
| 4,599,796 A | 7/1986 | Baba |
| D285,079 S | 8/1986 | Huthmacher |
| 4,633,658 A | 1/1987 | Nogawa |
| 4,641,431 A | 2/1987 | Leming et al. |
| 4,644,655 A | 2/1987 | Botamiller et al. |
| 4,651,421 A | 3/1987 | Zerrer |
| 4,660,286 A | 4/1987 | Engelbrecht et al. |
| 4,679,385 A | 7/1987 | Carmine |
| 4,685,279 A | 8/1987 | Gullett |
| 4,688,376 A | 8/1987 | Wolfe, Sr. |
| 4,704,849 A | 11/1987 | Gilbert et al. |
| 4,712,363 A | 12/1987 | Claborn |
| 4,724,632 A | 2/1988 | Bilsland et al. |
| 4,726,176 A | 2/1988 | McGrew |
| 4,736,573 A | 4/1988 | Seck |
| 4,756,146 A | 7/1988 | Rouse |
| 4,756,147 A | 7/1988 | Savell |
| 4,756,148 A | 7/1988 | Gander |
| 4,796,415 A | 1/1989 | Moore |
| 4,805,306 A | 2/1989 | Baba |
| 4,819,333 A | 4/1989 | Baba |
| 4,823,542 A | 4/1989 | Klever et al. |
| 4,829,755 A | 5/1989 | Nance |
| 4,852,258 A | 8/1989 | Foster |
| 4,856,194 A | 8/1989 | Lee |
| D304,728 S | 11/1989 | Piorkowski |
| 4,879,869 A | 11/1989 | Buckendorf, Jr. |
| 4,891,931 A | 1/1990 | Holland |
| 4,905,465 A | 3/1990 | Jones et al. |
| 4,914,899 A | 4/1990 | Carmine |
| 4,922,694 A | 5/1990 | Emoto |
| 4,926,557 A | 5/1990 | Haupt |
| 4,936,886 A | 6/1990 | Quillen |
| 4,945,717 A | 8/1990 | Schaffer |
| 4,981,012 A | 1/1991 | Claborn |
| 4,987,681 A | 1/1991 | Sepke |
| 4,989,321 A | 2/1991 | HOffmann |
| 5,010,649 A | 4/1991 | Hoffmann |
| 5,020,224 A | 6/1991 | Haupt |
| 5,023,998 A | 6/1991 | Masciarella et al. |
| 5,029,435 A | 7/1991 | Buchanan |
| 5,048,278 A | 9/1991 | Jones et al. |
| 5,060,383 A | 10/1991 | Ragkiewich |
| 5,092,112 A | 3/1992 | Buckendorf, Jr. |
| 5,197,264 A | 3/1993 | Lacey |
| 5,222,750 A | 6/1993 | Ellis |
| 5,263,303 A | 11/1993 | Stroud |
| 5,276,969 A | 1/1994 | Luick |
| 5,279,102 A | 1/1994 | Foster |
| 5,287,683 A | 2/1994 | Smith |
| 5,303,476 A | 4/1994 | Tuggle |
| 5,309,701 A | 5/1994 | McGuerty |
| 5,345,683 A | 9/1994 | Kanou |
| 5,398,416 A | 3/1995 | Mackey |
| 5,404,644 A | 4/1995 | Needham et al. |
| 5,406,708 A | 4/1995 | Stephens et al. |
| 5,408,816 A | 4/1995 | Cartier |
| 5,430,943 A | 7/1995 | Lee |
| 5,433,006 A | 7/1995 | Taguchi |
| 5,449,140 A | 9/1995 | Lastowski |
| 5,450,715 A | 9/1995 | Murray |
| 5,490,641 A | 2/1996 | Worthing |
| 5,493,783 A | 2/1996 | Oostendorp |
| 5,493,785 A | 2/1996 | Lawrence |
| 5,522,140 A | 6/1996 | Sugihara et al. |
| 5,526,572 A | 6/1996 | Sugihara et al. |
| 5,577,374 A | 11/1996 | Huston |
| 5,603,205 A | 2/1997 | Foster |
| 5,613,354 A | 3/1997 | Foster |
| 5,615,543 A | 4/1997 | Caffey et al. |
| 5,626,006 A | 5/1997 | Fricke, Sr. |
| 5,644,844 A | 7/1997 | Pink |
| 5,651,418 A | 7/1997 | Jerez |
| 5,657,542 A | 8/1997 | White, III et al. |
| 5,671,536 A | 9/1997 | Everts et al. |
| 5,675,897 A | 10/1997 | Berfield |
| 5,722,172 A | 3/1998 | Walden |
| 5,743,019 A | 4/1998 | Berfield |
| 5,749,148 A | 5/1998 | White, III et al. |
| 5,758,424 A | 6/1998 | Iacona et al. |
| 5,761,892 A | 6/1998 | Quiroga |
| 5,765,287 A | 6/1998 | Griffini et al. |
| 5,771,670 A | 6/1998 | Perry |
| 5,787,693 A | 8/1998 | Duke |
| 5,806,192 A | 9/1998 | Everts et al. |
| 5,829,236 A | 11/1998 | Ballard et al. |
| 5,836,142 A | 11/1998 | Maxwell |
| 5,836,227 A | 11/1998 | Dees, Jr. et al. |
| 5,839,262 A | 11/1998 | Sorensen |
| 5,850,728 A | 12/1998 | Rappolt |
| 5,852,876 A | 12/1998 | Wang |
| 5,862,598 A | 1/1999 | Lee |
| 5,867,911 A | 2/1999 | Yates et al. |
| 5,881,464 A | 3/1999 | Collins |
| 5,881,465 A | 3/1999 | Brant et al. |
| 5,887,348 A | 3/1999 | Iacona et al. |
| 5,890,352 A | 4/1999 | Molina |
| 5,896,666 A | 4/1999 | Iacona et al. |
| 5,901,448 A | 5/1999 | Lingerfelt |
| 5,970,692 A | 10/1999 | Foster |

| | | | | | | |
|---|---|---|---|---|---|---|
| 5,970,694 A | 10/1999 | Knox, Jr. | | 6,401,344 B1 * | 6/2002 | Moore et al. ............... 30/347 |
| 5,979,064 A | 11/1999 | Kitz et al. | | 6,519,857 B1 * | 2/2003 | Proulx et al. ............... 30/276 |
| 5,987,756 A | 11/1999 | Yates et al. | | 6,581,292 B1 * | 6/2003 | Allis ............................ 30/276 |
| 5,996,233 A | 12/1999 | Morabit et al. | | 6,666,009 B1 * | 12/2003 | Brandon ..................... 56/12.7 |
| 6,108,914 A * | 8/2000 | Sheldon ...................... 30/276 | | | | |
| 6,148,523 A * | 11/2000 | Everts et al. ............... 30/276 | | * cited by examiner | | |

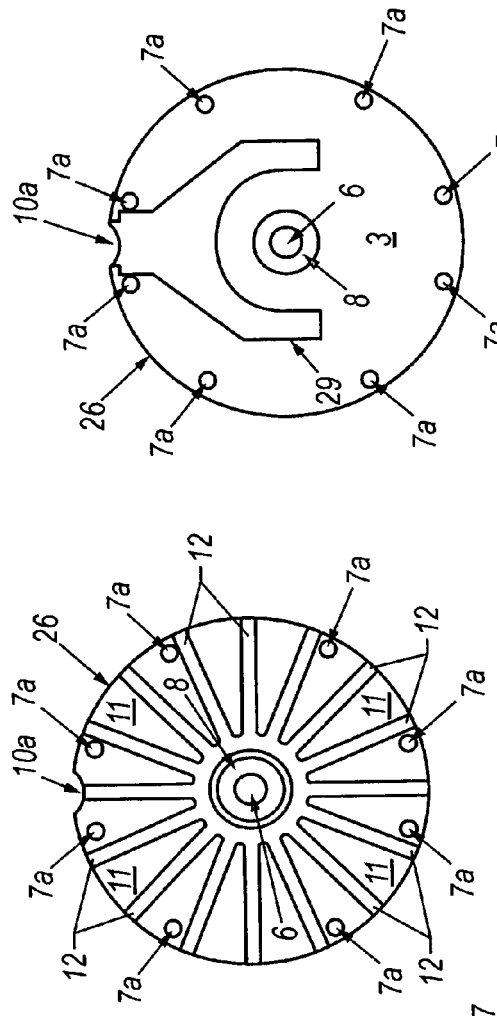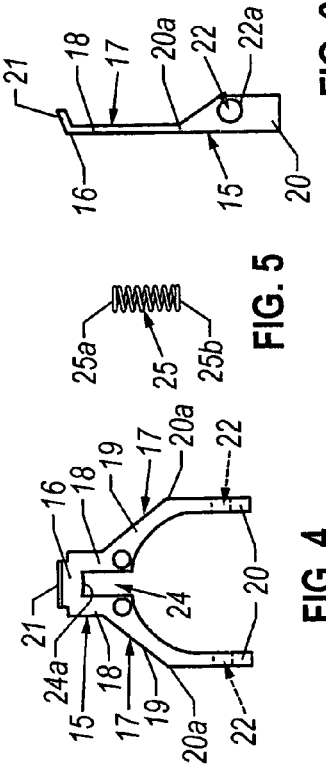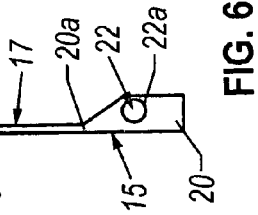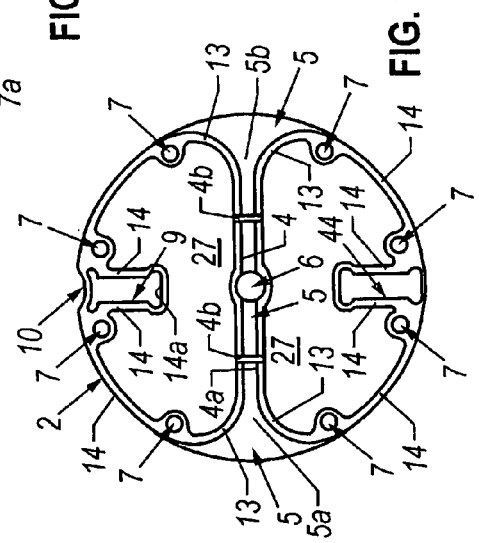
FIG. 1
FIG. 2
FIG. 3
FIG. 4
FIG. 5
FIG. 6
FIG. 7

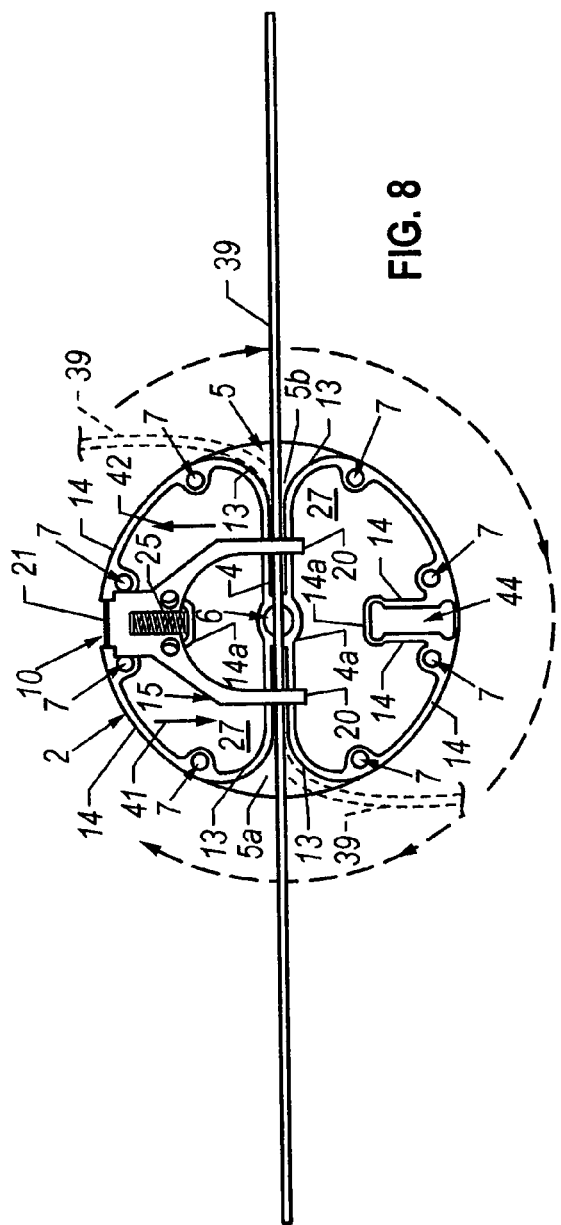

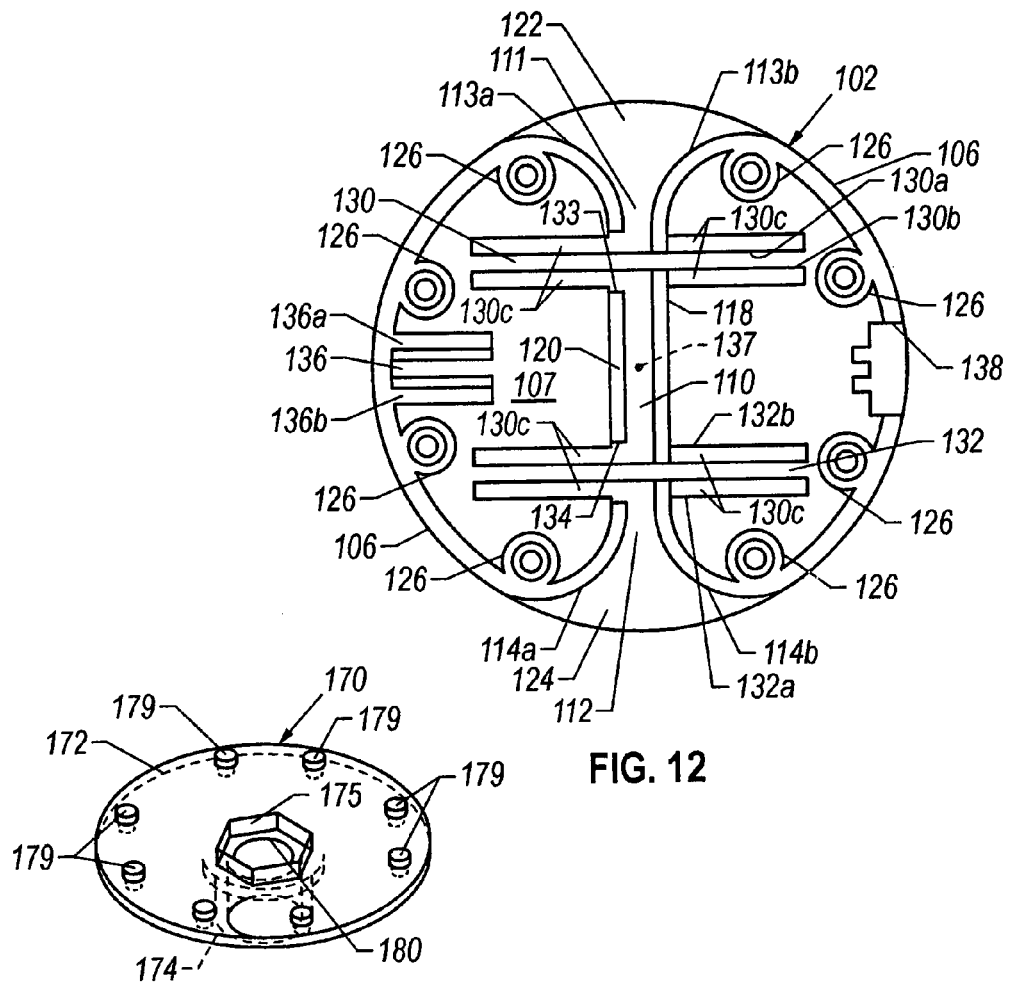
FIG. 12
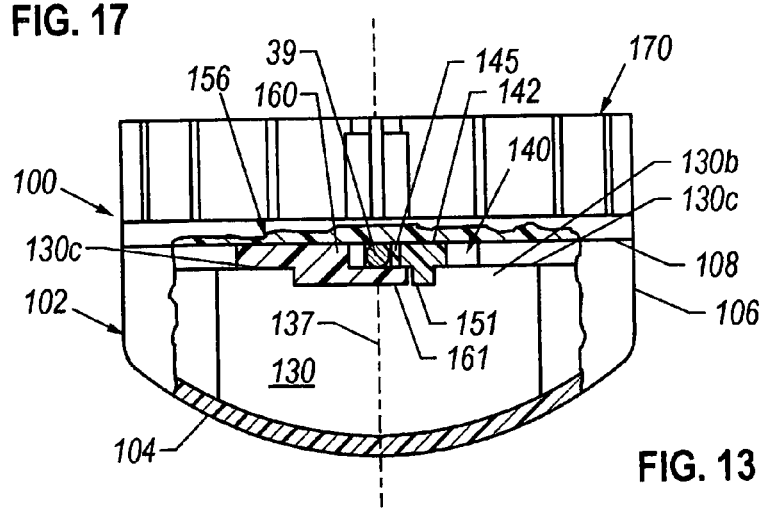
FIG. 17
FIG. 13

HEAD FOR LINE TRIMMING APPARATUS

CROSS REFERENCE TO RELATED APPLICATIONS

This application claims priority to provisional application No. 60/154,952 filed Sep. 21, 1999.

This application is a continuation-in-part of utility application Ser. No. 09/645,140 filed Aug. 24, 2000 now U.S. Pat. No. 6,401,344.

FIELD OF THE INVENTION

The present invention relates to flexible line trimming apparatus and, particularly, to a head for a flexible line trimming apparatus in which a flexible trimming filament or line segment may be inserted in the head and retained by a releasable clamping mechanism.

BACKGROUND

Rotary line trimmers are widely used for cutting or trimming grass, weeds and other vegetation in the upkeep of lawns. Line trimming apparatuses are typically characterized by a flexible, nylon trimming filament or "line" which is attached to a rotatable head of the apparatus. The line head is attached to a motor shaft which is rotated at high speeds, typically by trigger operation of a small gasoline engine or electric motor. When the line head is rotated, the rotating trimming filament serves as a cutting blade to cut grass, weeds or other vegetation.

After prolonged use of the apparatus, the cutting filament becomes worn and breaks, eventually requiring replacement. Accordingly, some line trimming apparatuses utilize a spool of the trimming filament or line which is incorporated in the whirling line head. The trimming filament is wound on the spool such that the filament can be dispensed from the spool as the rotating head is struck lightly against the ground. In other line trimming apparatuses, one or more short segments of trimming filament are attached to the line head for achieving the trimming function, and the trimming filaments are replaced by attaching replacement lengths of the trimming filament to the head. In both types of line trimming apparatus, the trimming filament typically extends from the line head through only one opening, and the edges of the opening engage the filament as the line head is rotated. After brief use of the apparatus, the edges tend to score the filament, causing premature breakage of the filament and requiring frequent and often difficult replacement of the filament in the head.

Line trimming apparatuses having heads of various design and including features for facilitating replacement of worn or broken trimming filaments, are well-known in the art. Patents of interest include U.S. Pat. Nos. 4,571,831; 5,303,476; 5,345,683; 5,758,424; 5,836,227; 5,887,348; and 5,896,666.

SUMMARY OF THE INVENTION

The present invention provides an improved head for a flexible line trimming apparatus.

A head for a line trimming apparatus according to this invention is characterized by a body including a filament channel which extends through the head and receives a trimming filament of selected length. The single, substantially linear trimming filament is releasably clamped in the filament channel and extends from opposite sides of the head to thereby double the cutting or trimming efficiency of the apparatus. The opposed ends of the filament channel are each characterized by generously curved filament contact and support walls which engage the filament during rotation of the head, to prevent excessively acute or sharp bending of the filament and thus, such construction of the head significantly enhances filament longevity.

The present invention also provides a head for a line trimming apparatus characterized by a body and a cover which are typically secured to a motor shaft of the apparatus and enclose a sliding filament clamp which receives a trimming filament of selected length and thickness.

In one embodiment the filament clamp is characterized by a pair of clamp arms which extend from a clamp base through a pair of adjacent walls of the body and define a filament channel therebetween which substantially bisects the body, and the trimming filament extends through the clamp arms in the filament channel and from the filament channel at opposite sides of the body. The filament clamp is normally biased in a clamping position in which the clamp arms press the trimming filament against one of the channel defining walls of the body, and the extending end portions of the clamped filament are capable of cutting or trimming weeds, grass or other vegetation as the head is rotated.

In another embodiment of a head in accordance with the invention, the filament clamp comprises spaced apart clamp arms which are engageable with a filament to forcibly urge the filament against one of the walls forming a filament receiving channel in the body. A separate actuator member having a digitally actuatable button formed thereon engageable with the clamp to move the clamp away from forcible engagement with the filament to allow removal and replacement thereof. In another embodiment of a head in accordance with the invention, the filament clamp comprises a U-shaped locking blade having two clamp slots in each arm. The clamp slots are of varying radii to accommodate different styles of filament. The locking blade is biased against the inside of a receiving channel in the body. This embodiment also includes a central metal arbor having an arbor hole which forms a part of the channel through which the filament fits. A filament is held in place by the pressure exerted on the filament between the clamp slots and the arbor hole. In the embodiments, the filament clamp can be moved to a release position in which it releases the trimming filament from forcible engagement with the body wall to facilitate removal and replacement of the trimming filament in the head, as needed.

In the embodiments of the invention, a spring biases a filament clamp in a clamping position in which the clamp arms press the trimming filament against one of the clamp walls of the body, such that the trimming filament is secured in the filament channel and the extending end portions of the filament are capable of cutting or trimming weeds, grass or other vegetation as the head is rotated. In addition to the bias exerted by the clamp spring, the weight of the filament clamp imparts centrifugal forces thereto which stabilizes it in the clamping position as the line head is rotated.

An object of this invention is to provide a head for a line trimming apparatus which utilizes a trimming filament segment which can be easily removed and replaced on the head, as needed.

Another object of this invention is to provide a head for a line trimming apparatus characterized by a body member and a cover which are attachable as an assembly to a motor shaft of the apparatus, and a filament clamp is disposed on the body for receiving and forcibly engaging a trimming filament, of selected length and thickness.

Another object of this invention is to provide a head for a line trimming apparatus characterized by a filament channel which extends through the head and receives a trimming filament releasably clamped in a filament channel and extends from opposite sides of the head to double the cutting or trimming efficiency of the apparatus, and the ends of which filament channel are each defined by a generously curved contact or support wall which engages the filament during rotation of the head, to prevent excessive bending and premature scoring and wearing of the filament so as to significantly enhance filament longevity.

Those skilled in the art will further appreciate the above-mentioned features and advantages of the invention together with other important aspects thereof upon reading the detailed description which follows in conjunction with the drawings.

BRIEF DESCRIPTION OF THE DRAWINGS

The invention will be better understood by reference to the accompanying drawings, wherein:

FIG. 1 is a top view of the cover component of one preferred embodiment of a head for a line trimming apparatus of this invention;

FIG. 2 is a bottom view of the cover illustrated in FIG. 1;

FIG. 3 is a top view of the body member of the head for a line trimming apparatus;

FIG. 4 is a top view of a filament clamp member of one preferred embodiment of the head for a line trimming apparatus;

FIG. 5 is a top view of the clamp spring member of the head of FIGS. 1 through 4;

FIG. 6 is a side view of the filament clamp member illustrated in FIG. 4;

FIG. 7 is a longitudinal view of a typical trimming filament for use with a head for a line trimming apparatus in accordance with this invention;

FIG. 8 is a top view of the body member, with the filament clamp fitted thereon and a trimming filament extending through the body member and the filament clamp;

FIG. 9 is an exploded view of the head embodiment of 5 FIGS. 1 through 8;

FIG. 10 is a side view of a conventional line trimming apparatus (illustrated in phantom), with the head of FIGS. 1 through 9 shown assembled and attached to the motor shaft of the apparatus;

FIG. 12 is a top plan view of the body member for the head shown in FIG. 11;

FIG. 13 is a section view taken along the line 13—13 of FIG. 11 with the cover and body assembled;

FIG. 17 is a perspective view of the cover for the embodiment of FIGS. 11 through 15 in an inverted position.

DETAILED DESCRIPTION OF PREFERRED EMBODIMENTS

Figure 11:
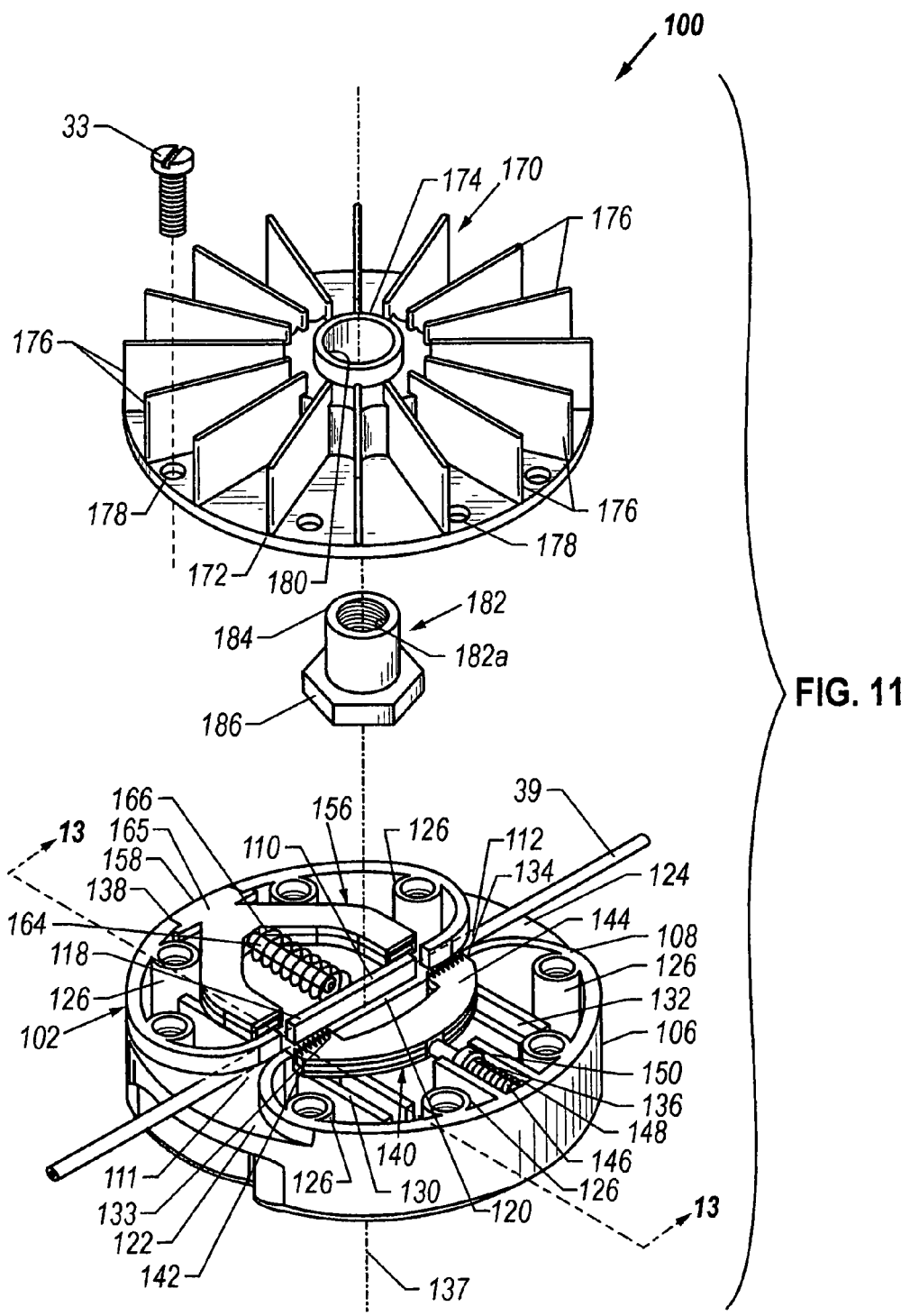
FIG. 11 is an exploded perspective view of an alternate embodiment of a head for a line trimming apparatus in accordance with the invention.

Referring initially to FIGS. 1 through 3, 9 and 10 of 30 the drawings, in one preferred embodiment a head for a line trimming apparatus is generally illustrated and designated by reference numeral 1 in FIGS. 9 and 10. As illustrated in FIG. 10, the head 1 is designed to be mounted for rotation with the motor shaft 37 of a conventional line trimming apparatus 35 (illustrated in phantom), typically characterized by a motor housing 36 which is provided on a handle 38 and houses an electric or gasoline-powered drive motor (not illustrated) for rotating a motor shaft 37, typically by actuation of a finger-operated trigger (not illustrated) provided on the handle 38. In operation of the head 1 as hereinafter further described, a flexible, linear, typically nylon, trimming filament 39, FIG. 7, of selected length and thickness extends through the head 1 as illustrated in FIG. 8, and is clamped therein to facilitate cutting or trimming grass, weeds or other vegetation by means of the opposed extending end portions of the rotating trimming filament 39. The head 1 includes a generally circular body member 2, typically constructed of molded plastic, surface extends through the body 2 for receiving a shaft bolt 31, as illustrated in FIG. 9. The shaft bolt 31 secures the assembled head 1 on the motor shaft 37 of the line trimming apparatus 35, as illustrated in FIG. 10 and hereinafter further described.

As illustrated in FIG. 3, a first clamp wall 4 and a second clamp wall 4a extend from the interior body surface 27 of body 2 in adjacent, spaced-apart relationship with respect to each other.

A filament channel 5, delimited by diametrically opposed openings 5a and 5b, FIG. 3, is formed between the parallel first clamp wall 4 and second clamp wall 4a, and bisects the body 2 into substantially equal halves. Spaced apart clamp arm slots 4b, the purpose of which will be hereinafter described, extend transversely through the first clamp wall 4, filament channel 5 and second clamp wall 4a, metal or fiberglass and having an interior bottom 27, as illustrated in FIG. 3, and an exterior (not illustrated). A central shaft bolt opening 6 respectively, on each side of the shaft bolt opening 6. The opposed end portions of the first clamp wall 4 and second clamp wall 4a are each curved generously to define a curved filament contact and support surface 13, each of which is continuous with a rim 14 which projects from the interior surface 27 along the edge or periphery of the body 2.

As further illustrated in FIG. 3, each rim 14 invaginates inwardly toward the central shaft bolt opening 6 to define at one pole of the body 2, an elongated spring 10 cavity 9 having a wall 14a, and at the opposite pole of the body 2, a counterweight cavity 44. The spring cavity 9 receives a coil clamp spring 25 (FIG. 5), and the counterweight cavity 44 receives, typically, a lead counterweight (not illustrated), the purpose of which clamp spring 25 and counterweight will be hereinafter described. A clamp opening 10 is provided in the clamp rim 14, adjacent to the spring cavity 9. Multiple mount bolt openings 7 extend through the clamp rim 14 and body 2, in spaced-apart relationship with respect to each other around the circumference thereof for purposes which will be hereinafter further described.

As illustrated in FIGS. 1, 9 and 10, a cover 26, typically constructed of plastic, metal or fiberglass and having an interior cover surface 3, as illustrated in FIG. 2, and an exterior cover surface 11, as illustrated in FIG. 1, is mounted on the body 2, in assembly of the head 1 as hereinafter described. In one preferred embodiment illustrated in FIG. 1, multiple, circumferentially spaced cooling air propelling vanes or blades 12 typically project from the exterior cover surface 11 of the clamp cover 26, and extend radially from the central shaft bolt opening 6, in spaced-apart relationship with respect to each other for causing cooling air to flow over or through the motor housing 36 by convection during operation of the conventional electric motor powered line trimming apparatus 35. In another embodiment (not illustrated), the cooling air vanes 12 are typically omitted from the cover 26 under circumstances in which the head 1 is to be used with a conventional gasoline-powered line trimming apparatus. Multiple mounting bolt openings 7a extend through the cover 26 in spaced-apart relationship with respect to each other around the circumference thereof, and match the respective mounting bolt openings 7 of the body 2. Washer seats 8 are recessed in the interior cover surface 3 (FIG. 2) and exterior cover surface 11 (FIG. 1), respectively, in concentric relationship to the shaft bolt opening 6, for receiving a first washer 32a and second washer 32b, respectively, in assembly of the head 1 as illustrated in FIG. 9 and hereinafter further described.

The cover 26 is mounted on the body 2 with the interior cover surface 3 facing the interior plate surface 27 of the body 2, by extending mounting bolts 33 through the respective 20 bolt openings 7a of the cover 26 and registering in bolt openings 7 of the body 2, as illustrated in FIG. 9 and hereinafter further described. As illustrated in FIG. 2, a clamp depression 29 is formed in the interior cover surface 3 of the clamp cover 26, for purposes which will be hereinafter further described. As illustrated in FIGS. 1 and 2, an opening 10a is provided in the edge of the cover 26, adjacent to the clamp depression 29, and complements the clamp opening 10 (FIG. 3) of the body 2 in the assembled head 1.

Referring next to FIGS. 4 through 6, 8 and 9 of the drawings, a filament clamp 15, typically metal, is seated in the congruent clamp depression 29 (FIG. 2) of the cover 26, and is slidably disposed between the body 2 and cover 26 of the assembled head 1. As illustrated in FIG. 4, the filament clamp 15 is characterized by a clamp base 16 and includes a pair of coextensive clamp arms 17, each having a straight arm segment 18 which extends from the clamp base 16 in substantially parallel, spaced-apart relationship with respect to the straight arm segment 18 of the opposite clamp arm 17. A substantially rectangular spring slot 24 is defined between the parallel straight arm segments 18 of the filament clamp 15, and is bounded on one end by a slot wall 24a of the clamp base 16. An angled arm segment 19 extends at an angle from each straight arm segment 18 of the clamp arm 17, and a parallel arm segment 20 extends from each angled arm segment 19 at an arm bend 20a.

A clamp actuator member 21, comprising a button or trigger, is provided on the clamp base 16 and, typically having scalloped edges (not illustrated), rests against the rim 14 of the body 2 in the assembled head 1, and is exposed through the opening 10 of the rim 14 as illustrated in FIG. 8 and hereinafter further described. As illustrated in FIG. 6, a filament opening 22 is provided in each parallel arm segment 20 of the filament clamp 15, in substantially registering or coaxial relationship with respect to the filament opening 22 of the opposite parallel arm segment 20. Each filament opening 22 is delimited by a clamp edge 22a of the corresponding parallel arm segment 20 of the filament clamp 15.

Referring next to FIGS. 7–10 and particularly to FIG. 8 of the drawings, in assembly of the head 1 the filament clamp 15 is positioned on the body 2, with the scalloped clamp button or trigger 21 of the clamp base 16 abutting against the rim 14 of the body 2 and exposed through the clamp opening 10 of the rim 14. The parallel arm segments 20 of the filament clamp 15 are fitted in the respective clamp arm slots 4b (each provided in the first clamp wall 4, filament channel 5 and second clamp wall 4a, respectively, of the body 2, FIG. 3). Accordingly, the spring slot 24 (FIG. 4) of the filament clamp 15 overlies the spring cavity 9 (FIG. 3) of the body 2. The clamp spring 25 is inserted through the spring slot 24 and seated in the underlying spring cavity 9, with the first end 25a of the clamp spring 25 engaging the convex slot wall 24a of the clamp base 16, and the second end 25b engaging the spring wall 14a of the spring cavity 9. The clamp spring 25 biases the clamp button 21 of the filament clamp 15 against the rim 14 of the body 2, with the filament openings 22 (FIG. 6, provided in the respective parallel arm segments 20 of the filament clamp 15), located partially in the first clamp wall 4 portion of the clamp arm slots 4b, and partially in the filament channel 5. A typically lead counterweight (not illustrated) is fitted in the counterweight cavity 44 (FIG. 8) of the body 2, for purposes which will be hereinafter described.

The shaft bolt 31 is extended through the shaft bolt opening 6 of the body 2, and the first washer 32a is inserted on the shaft bolt 31. The cover 26 is placed on the rim 14 of the body 2, with the f filament clamp 15 fitted in the congruent clamp depression 29 (FIG. 2) on the interior cover surface 3 of the cover 26. The cover 26 is then secured to the body 2 as heretofore described, by threading the mounting bolts 33 (FIG. 9) through the bolt openings 7 of the body 2 and registering bolt openings 7a of the clamp cover 26. As the shaft bolt 31 is next extended through the shaft bolt opening 6 of the cover 26, the first washer 32a, provided on the shaft bolt 31, is seated in the washer seat 8 recessed in the interior cover surface 3 (FIG. 2) of the cover 26, as illustrated in FIG. 9. The filament clamp 15 is thus secured between the body 2 and cover 26.

By exerting finger pressure on the scalloped clamp button 21 through the opening 10 of the body 2 and cover 26, the filament clamp 15 can be slidably displaced in the clamp depression 29 of the cover 26, against the spring 25 in the radial inward direction toward the central axis of rotation of head 1, as indicated by the arrow 41 in FIG. 8, for purposes which will be hereinafter further described. As finger pressure is released from the clamp button 21, the spring 25 returns the filament clamp 15 to the original position, in the direction indicated by the arrow 42 in FIG. 8

As illustrated in FIGS. 9 and 10, in typical operation the assembled head 1 is initially secured to the motor shaft 37 of the line trimming apparatus 35. This is accomplished by initially inserting a second washer 32b on the shaft bolt 31 (extending through the shaft bolt opening 6 of the clamp cover 26), seating the second washer 32b in the washer seat 8 (FIG. 1) recessed in the exterior cover surface 11 of the clamp cover 26, and threading and seating the shaft bolt 31 in a threaded bolt opening (not illustrated) provided in the motor shaft 37. As the clamp button 21 of the filament clamp 15 is pressed to reposition the filament clamp 15 against the spring 25 in the direction indicted by the arrow 41 in FIG. 8, the filament openings 22 (FIG. 6) in the parallel arm segments 20 of the filament clamp 15, normally located partially in the respective clamp arm slots 4b of the first clamp wall 4 and partially in the filament channel 5 of the body 2, become entirely located in the filament channel 5.

A flexible, typically nylon, trimming filament 39 (FIG. 7) of selected length is then-extended through the filament channel 5 and filament openings 22, until, typically, substantially equal lengths of the trimming filament 39 extend from the filament channel 5 at respective 12 sides of the body 2. The clamp button 21 of the clamp 15 is then released, causing the clamp spring 25 to reposition the filament clamp 15 in the direction indicated by the arrow 42, to the original position, thereby partially relocating the filament openings 22 from the filament channel 5 toward the respective clamp arm slots 4b (FIG. 3) of the first clamp wall 4, as the parallel arm segments 20 of the filament clamp 15 slide in the respective clamp arm slots 4b. This action causes the clamp edge 22a (FIG. 6) of each parallel arm segment 20 of the filament clamp 15 to press the trimming filament 39 against the first clamp wall 4, thus securing the trimming filament 39 in the filament channel 5.

Accordingly, the line trimming apparatus 35 is operated in conventional fashion typically by finger operation of a throttle actuator (not illustrated), to rotate the head 1 with the motor shaft 37 and facilitate the cutting or trimming of grass, weeds, foliage or other vegetation by means of the rotation trimming filament 39. In addition to bias exerted on the filament clamp 15 by the spring 25, the weight of the sliding filament clamp 15 imparts centrifugal tension to the filament clamp 15 which stabilizes it in the clamping position as the head 1 is rotated. The clamp counterweight (not illustrated) seated in the counterweight cavity 44 (FIG. 8) of the body 2, stabilizes the rotating head 1 by balancing the weight of the eccentric filament clamp 15 at the opposite pole of the body 2. It will be appreciated by those skilled in the art that when the head 1 is rotated in the clockwise direction indicted by the broken arrows in FIG. 8, a contact radius 13 of the first clamp 30 wall 4 and second clamp wall 4a, respectively, engage the exiting portions (illustrated in phantom) of the trimming filament 39. This action facilitates rotation of the trimming filament 39 with the head 1, while preventing excessive 13 bending and premature wearing, scoring or breaking of the trimming filament 39 after prolonged use by inducing a gradual, rather than a sharp, bend in the exiting portion of the trimming filament 39.

Replacement of the eventually broken or worn trimming filament 39 is accomplished, as needed, by initially pressing the clamp button 21 to displace the filament clamp 15 in the direction indicated by the arrow 41 in FIG. 8; removing the released trimming filament 39 from the parallel arm segments 20 of the filament clamp 15 and filament channel 5 of the clamp plate 2; inserting a replacement trimming filament 39 through the filament channel 5 and filament openings 22 of the parallel arm segments 20; and releasing the clamp button 21 of the clamp 15, to again cause displacement of the clamp 15 in the direction indicated by the arrow 42 in FIG. 8 and engagement of the replacement trimming filament 39 against the first clamp wall 4 by operation of the parallel arm segments 20.

Referring again to FIG. 8, in another embodiment a second filament clamp (not illustrated), having substantially the same design as the first filament clamp 15 heretofore described, may be provided on the body member 2, opposite the first filament clamp 15 for further stabilizing the trimming filament 39 in the filament channel 5. The 25 parallel arm segments (corresponding to reference numeral 20 in FIG. 8) of the second filament clamp (not illustrated) are typically spaced a wider distance apart than the parallel arm segments 20 of the first filament clamp 15. The width of slots 4b could be increased to receive the arms 30 of the second clamp. The second filament clamp is then biased in the opposite direction of the bias imparted by the clamp spring 25 on the first filament clamp 15 described above, by means of a second clamp spring (corresponding to 14 spring 25 in FIG. 5), seated in the counterweight cavity 44 in the same manner that the clamp spring 25 is seated in the spring cavity 9, as heretofore described. The parallel arm segments of the second filament clamp could also be 5 fitted in a second set of respective clamp arm slots (corresponding to reference numeral 4b in FIG. 3), typically located outside of and spaced from the respective clamp arm slots 4b described above with respect to FIG. 3.

The trimming filament 39 would extend through the filament openings 22 (FIG. 6) of both the first filament clamp 15 and corresponding openings in the second filament clamp, and the second filament clamp then normally would clamp the trimming filament 39 against the second wall 4a of the body 2, in the same manner that the first filament clamp 15 clamps the trimming filament 39 against the fist clamp wall 4 as heretofore described. A second opening 10 would be provided in the rim 14 adjacent to the counterweight cavity 44, and pressure could be simultaneously applied to both of the clamp actuator buttons (corresponding to numeral 21 in FIG. 8) of the respective first filament clamp 15 and second filament clamp, through respective openings 10 to release a trimming filament 39 from the first clamp wall 4 and second clamp wall 4a, respectively, and facilitate securing a replacement trimming filament 39 in the filament channel 5. It is understood that in this embodiment of the head 1, the first filament clamp 15 and second filament clamp balance each other in the rotating head I during operation of the line trimming apparatus 35, rendering the counterweight (not illustrated) seated in the counterweight cavity 44 as described above, unnecessary.

It will be appreciated by those skilled in the art that the head 1 enables quick and convenient replacement of trimming filaments, as needed, and contributes to longevity of the trimming filament 39 due to the unique curved design of the contact and support wall portions 13 of the first clamp wall 4 and second clamp wall 4a, respectively, as heretofore described. Extension of the trimming filament 39 from opposite sides of the head 1 substantially doubles the cutting efficiency of the trimming filament 39, as compared to most conventional line trimmers in which the trimming filament 39 typically extends from one opening in the line head. Furthermore, the head 1 is universal for attachment to virtually any type of existing conventional line trimming apparatus 35. It is understood that more than one trimming filament 39 of selected thickness can be clamped in the filament clamp 15, as desired, for cutting or trimming thick growth of grass, weeds or other vegetation.

Referring now to FIGS. 11 and 12, in particular, another preferred embodiment of a head in accordance with the invention is illustrated and generally designated by the numeral 100. The head 100 includes a generally cylindrical body member 102 having a somewhat hemispherical bottom wall 104, see FIG. 13, which is joined to a circular sidewall or rim 106 delimited by a transverse top surface 108. Rim 106 is also intersected at diametrally opposite sides thereof by a filament receiving channel 110 at diametrally opposed openings 111 and 112 to the channel. As shown in particular in FIG. 12, openings 111 and 112 are also defined by generously curved opposed sidewall entry portions 113a and 113b and 114a and 114b, respectively. The radii of the wall portions 113a, 113b, 114a and 114b are preferably about 0.50 inches to 0.65 inches for a channel 110 having a width of about 0.17 inches. Wall portions 113a, 113b, 114a and 114b merge with the circular rim 106, as shown, and are adapted to support a filament 39 in the same manner as wall portions 13 of head 1.

Hemispherical bottom wall 104 and rim 106 define a cavity 107, FIG. 12, in which upstanding spaced apart planar walls 118 and 120 are provided and extend between opposed planar shelf portions 122 and 124 which also extend between the respective radius wall portions 113a, 113b and 114a, 114b to provide support for an elongated flexible filament member 39. Plural, circumferentially spaced and counter-bored fastener receiving bosses 126 are integrally formed with rim 106, as shown in FIGS. 11 and 12. Shelves 10 122 and 124 are coplanar and extend toward each other at least partially within the channel 110.

As shown in FIG. 12, in particular, spaced apart elongated slots 130 and 132 extend substantially perpendicular to channel 110 and are defined, respectively, 15 by closely spaced upstanding planar sidewalls 130a and 130b defining slot 130 and corresponding sidewalls 132a and 132b defining slot 132. Slots 130 and 132 also separate curved wall portions 114b and 113b from channel defining wall 118, and wall 120 from wall portions 113a and 114a, respectively. Channel defining sidewall 120 is of shorter overall length than wall 118 to define respective gaps 133 and 134.

Referring further to FIG. 12, a spring retaining slot 136 extends generally parallel to the slots 130 and 132 and extends radially inwardly toward central axis 137 of head 100 and of body member 102, as defined by opposed sidewalls 136a and 136b. As also shown in FIG. 12, a clamp actuator button receiving opening 138 is formed in rim 106 opposite slot 136.

Figure 15:
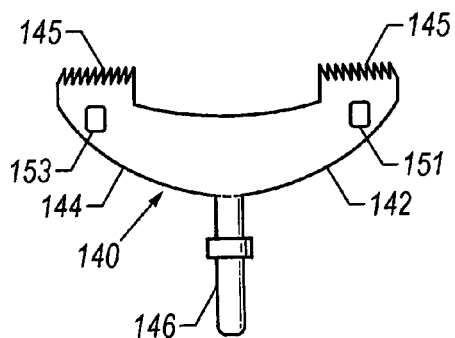
FIG. 15 is a bottom plan view of the filament clamp for the embodiment of the head of FIGS. 11 through 14.

Referring again to FIG. 11, the head 100 includes a filament clamp 140 including opposed clamp arms 142 and 144 which are dimensioned to fit slidably within gaps 133 and 134 as shown. Clamp 140 also includes an elongated generally cylindrical spring retainer guide pin 146 which is adapted to project into slot 136 and be journaled within a coil compression spring 148 also disposed in slot 136. An integral collar 150 of pin 146 engages one end of spring 148 to bias clamp 140 to move into the channel 110 and forcibly engage a filament 39. As shown in FIG. 15, clamp arms 142 and 144 are provided with serrations or teeth 145 adapted to be urged into gripping engagement with filament 39 by spring 148. Clamp 140 also includes depending guide and actuator tabs 151 and 153 formed thereon, see FIG. 15, and which are adapted to be disposed in the slots 130 and 132, respectively. Accordingly, clamp 140 is supported on coplanar bearing surfaces 130c, FIGS. 12 and 13, delimiting the top edges of walls 130a, 130b, 132a and 132b, is movable radially inwardly and outwardly with respect to the axis 137 and the rim 106 and is biased radially inwardly toward the axis by the coil spring 148.

Figure 14:
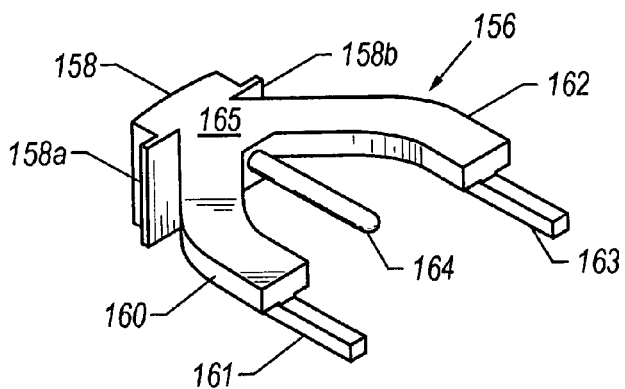
FIG. 14 is a perspective view of a clamp release actuator member for the embodiment of the head of FIGS. 11 through 13.

Referring further to FIG. 11, and also FIG. 14, clamp 140 is adapted to be actuated by an actuator member, generally designated by the numeral 156, which includes an integral button or trigger part 158 adapted to project through opening 138 in rim 106, see FIG. 11, and is integrally formed with opposed parallel extending arms 160 and 162. Button 158 includes opposed flanges 158a and 158b engageable with rim 106 adjacent the opening 138. Arms 160 and 162 have generally parallel guide and actuator projections 161 and 163, see FIG. 14, formed thereon and dimensioned to be slidably disposed in the slots 130 and 132, respectively, and also engageable with tabs 151 and 153, see FIG. 13 by way of example. The width of projections 161 and 163 is less than the width of the arms 160 and 162 so that the arms may be slidably disposed on top surface 130c delimiting the sets of slot defining walls 130a, 130b and 132a, 132b to slidably support the actuator member 156 for movement toward and away from clamp 140.

A spring retainer and support pin 164 extends generally parallel to and between arms 160 and 162 from an integral base portion 165 of actuator member 156, which base portion is also integrally formed with button 158. A coil spring 166, FIG. 11, is disposed over the pin 164 and extends between base portion 165 and wall 118 and is operable to bias the actuator member 156 radially outwardly away from axis 137 so that clamp 140 may have unrestricted ability to forcibly clamp filament 39 against the channel defining wall 118. However, in response to depressing button 158 radially inwardly of rim 106, the projections 161 and 163 engage tabs 151 and 153 to move the clamp 140 radially outwardly away from channel 110 to allow a filament 39 to be removed therefrom and replaced with a new filament. When button 158 is released, actuator member 156 is returned to the position shown in FIG. 11 so that clamp 140 may move into channel 110 to forcibly engage a new filament which has been inserted from either one of openings 111 or 112 into channel 110.

Figure 16:
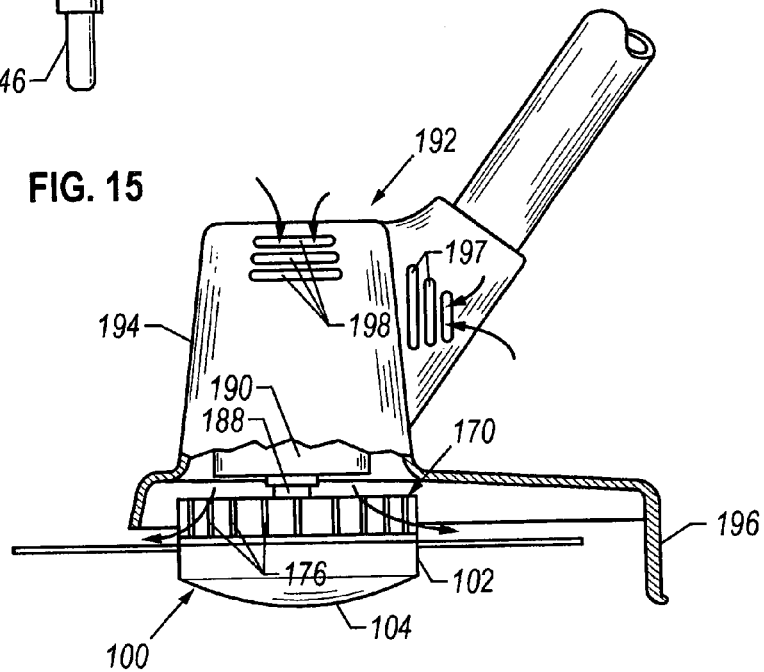
FIG. 16 is a side elevation, partially sectioned, showing the head embodiment of FIGS. 11 through 15 connected to a drive motor of a line trimming apparatus.

Referring further to FIGS. 11, 13 and 17, the head 100 also includes a generally circular disk-shaped cover 170 having a cylindrical disk-shaped cover part 172 and a central hub 174. Plural, circumferentially spaced, radially projecting cooling air blades 176 are integrally formed with the hub 174 and the disk part 172, as shown in FIG. 11. Circumferentially spaced fastener receiving bores 178 are adapted to receive fasteners 33, one shown, for securing cover 170 to body member 102 at support surface or face 108. Hub 174 includes a central cylindrical bore 180 for receiving an internally threaded insert 182 having a cylindrical boss portion 184 and a hex-shaped flange portion 186 which is adapted to fit nonrotatably in a correspondingly shaped counterbore portion 175 of boss 174, see FIG. 17. As also shown in FIG. 17, locating bosses 179 project from disk part 172 for registration with counterbored bosses 126 on body 102. Insert 182 is internally threaded at 182a, FIG. 11, for securing the head 100 to a correspondingly threaded drive shaft 188, see FIG. 16, of a motor 190 for a line trimming apparatus 192.

Accordingly, cover 170 is releasably securable to the body 102 by fasteners 33 to retain the working parts comprising the clamp 140, actuator member 156 and the respective biasing springs 148 and 166 in assembly with the body as described above. Referring briefly again to FIG. 16, line trimmer apparatus 192 includes a motor shroud 194 and a generally radially extending line guard 196. Motor shroud 194 may include suitable cooling airflow inlet ports 197 and 198 formed therein to allow motor cooling air to flow into the shroud and through the cooling air impeller blades 176 provided on the head 100.

Accordingly, head 100 may be easily connected to and disconnected from a line trimmer, such as the trimmer apparatus 192, by threadedly connecting the head to motor shaft 188. As previously described, cutting filament 39 may be easily replaced, without removing the head 100 from the line trimmer apparatus, by depressing actuator button 158 to release forcible engagement of the clamp 140 with the filament and then inserting a new filament through openings 111 or 112 and sliding the filament through the channel 110 until it is substantially centered with respect to the opposite ends of the filament and the central axis 137. Button 158 may then be released to—allow clamp 140 to forcibly clamp and retain a new filament on the head 100 for cutting operations.

The parts of head 100 including the body 102, clamp 140, actuator member 156 and cover 170 may be formed of a suitable injection moldable polymer material such as reinforced nylon. The insert 182 may have selectively differing thread configurations of the threads 182 and is preferably formed of a suitable metal material such as aluminum or steel. Filament 39 may be of a suitable polymer material, such as nylon, and may have a diameter of up to about 0.080 inches for conventional line trimmer motor sizes adapted to operate at 4,000 to 6,000 rpm. Filament 39 may be of various lengths. A preferred length is about eighteen inches.

Figure 18:
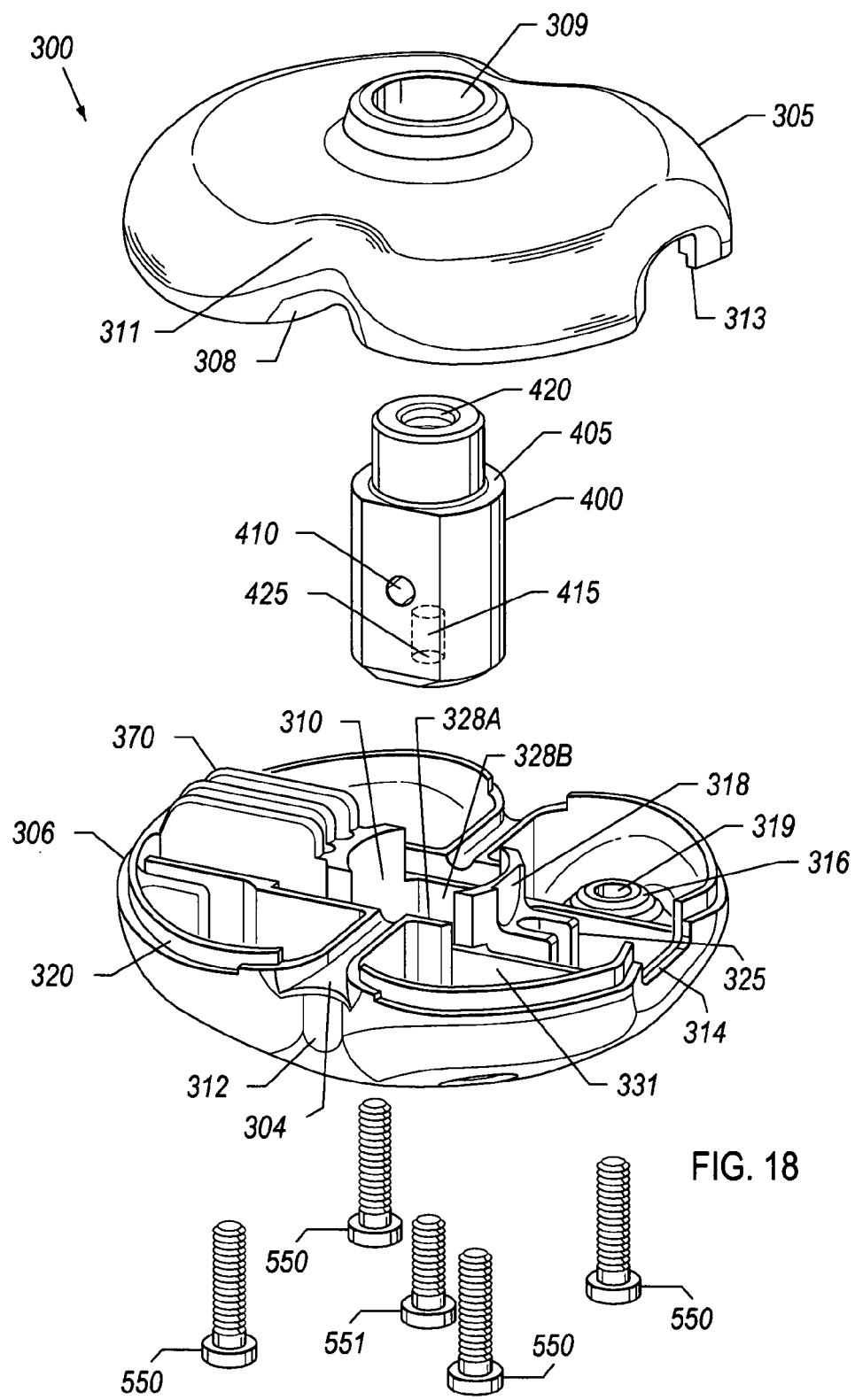
FIG. 18 is an exploded perspective view of an alternate embodiment of the apparatus.
Figure 19A:
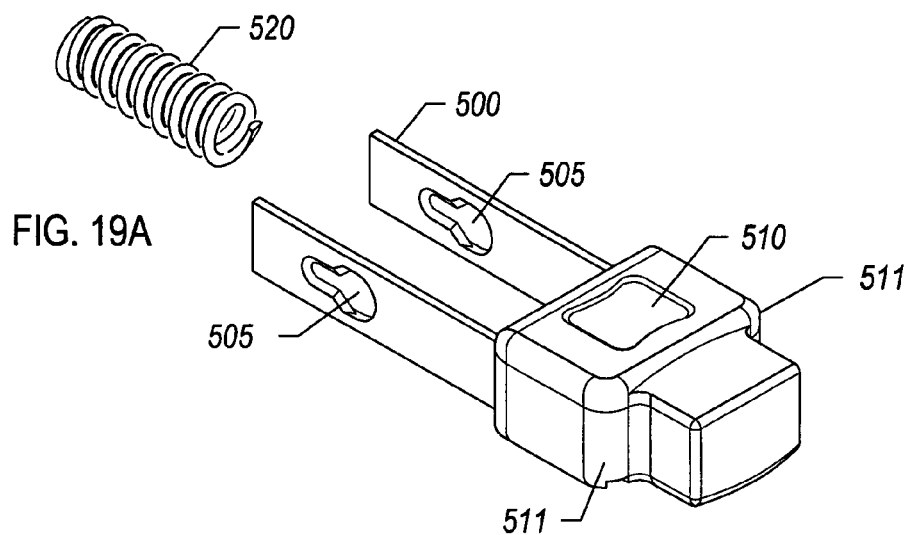
FIGS. 19A and 19B show the locking blade, button and spring of an alternative embodiment.

Referring to FIG. 18, a third embodiment of the present invention will be described. In FIG. 18, a head 300 for a line trimming apparatus is shown in an exploded isometric view. The head trimmer consists of six pieces, upper cover 305, lower cover 306, arbor 400, and, as shown in FIG. 19a, coil spring 520, cooperating locking blade 500 and button 510.

Upper cover 305 and lower cover 306, in this preferred embodiment are molded plastic, but could as well be a light composite, fiberglass or alloy, or other material with suitable strength to maintain the positions of internal parts. Upper cover 305 has a rounded exterior shape including arbor hole 309, curved entry 311, upper filament channel 308, and upper button opening 313.

Figure 20:
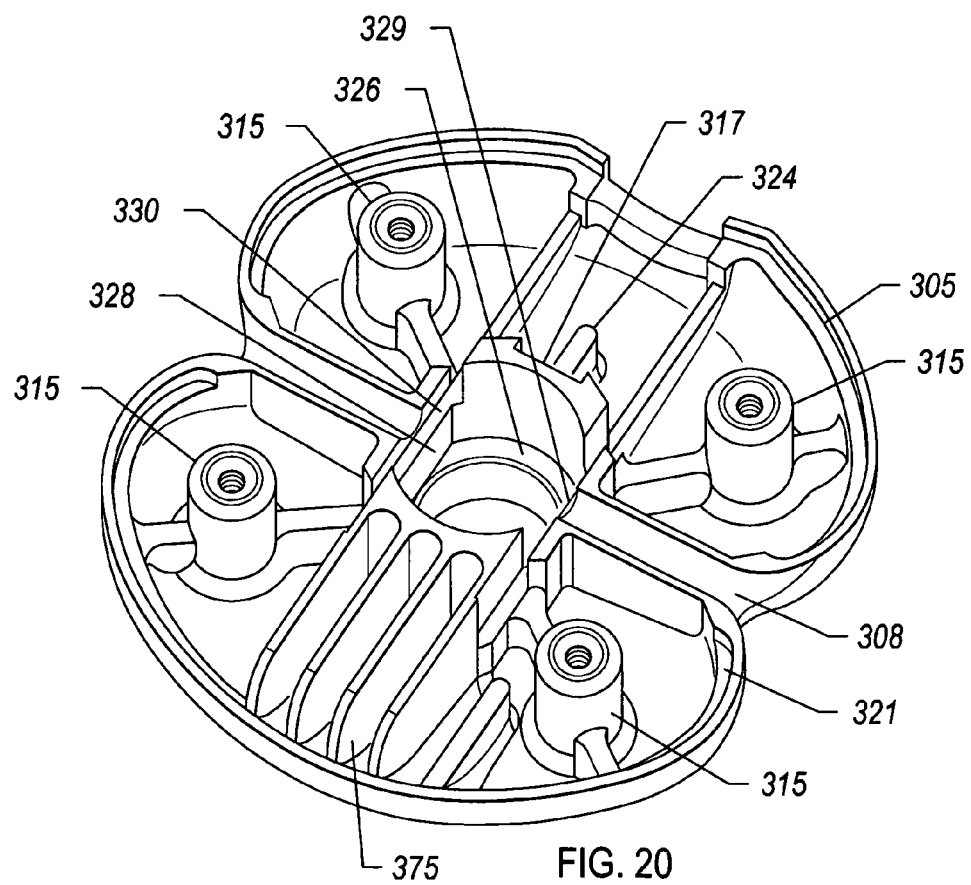
FIG. 20 is the underside view of the upper cover.

Referring to FIG. 20, which is the bottom view of upper cover 305, it can be seen that upper cover 305 also includes upper filament channel 308, four upper stanchions 315, and upper spring seat 317. Still referring to FIG. 20, upper cover 305 also includes spring support 324 and two upper arbor positioning faces 328 and 329. Additionally, upper cover 305 includes four upper structural counterweights 375.

Upper cover 305 cooperates with lower cover 306, shown in FIG. 18, to form an enclosure for the internal working components of the assembled head. When assembled, coupling receiver 321 on the inside of the outside edges of upper cover 305 cooperates with a raised coupling lip 320 on lower cover 306 to create a rigid interface between upper cover 305 and lower cover 306. Lower cover 306 also includes three lower structural counterweights 370 which, when upper cover 305 and lower cover 306 are assembled, matingly interface with upper structural counterweights 375. The structure of upper structural counterweights 375 and lower structural counterweights 370 is unique. They are formed to serve two purposes; first, to offset the weight of locking blade 500 and button 510, and second, as a structural support for the outside of upper cover 305 and lower cover 306. A unique advantage is gained by the structure of lower structural counterweights 370 and upper structural counterweights 375 by closely controlling the position of the counterweight and preventing sagging or bulging of upper cover 305 and lower cover 306.

Lower cover 306 also includes a lower filament channel 304 which, when upper cover 305 and lower cover 306 are assembled, cooperates with the upper filament channel 308 to form a hole or entryway for the placement of the filament through the head. Lower cover 306 also includes a curved entry 312 which, when the upper and lower covers are assembled, cooperates with curved entry 311 of upper cover 305 to provide a smooth mating surface on which the filament when inserted into the head will travel. Curved entry 312 and curved entry 311 are duplicated on the opposite side of each of the lower and upper covers 306 and 305, respectively, and suitably shaped so that the filament experiences a curved surface 360 degrees around its axis. The curved surface prevents wearing and fracturing of the filament from bending when the head is in operation.

Lower cover 306 also has four lower stanchions 316, including stanchion holes 319 in each quadrant of the cover. When assembled, self-locking screws 550 fit through stanchion holes 319 and into upper stanchions 315 in upper cover 305. Each of self-locking screws 550 is a self-tapping, PLASTITE® screw provided, in the preferred embodiment, by Textron Fastener Systems, Inc. of Decorah, Iowa. Upper stanchions 315 are not threaded, and upon assembly of upper cover 305 and lower cover 306, and insertion of self-locking screws 550, seal around self-locking screws 550 to prevent the screws from backing out during operation of the head.

When assembled, each lower stanchion 316 comes in contact with its upper stanchion counterpart 315. Importantly, lower stanchions 316 and upper stanchions 315 do not actually touch when the head is assembled until self-locking screws 550 and 551 are in place and tightened. In the preferred embodiment, a $1/30,000$-inch gap exists. The pressure created by collapsing the gap between the stanchions adds additional biasing pressure on each self-locking screw 550 and further prevents its dislodging during operation of the head. After assembled, upper threaded hole 420 of arbor 400 is visible through arbor hole 309. Upper threaded hole 420 is then threaded onto the threaded receiving shaft of trimmer 35 as shown in FIG. 10.

Figure 19B:
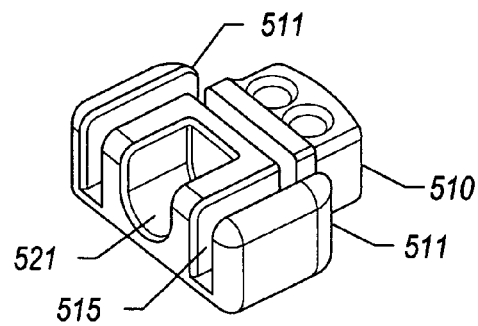
Figure 21:
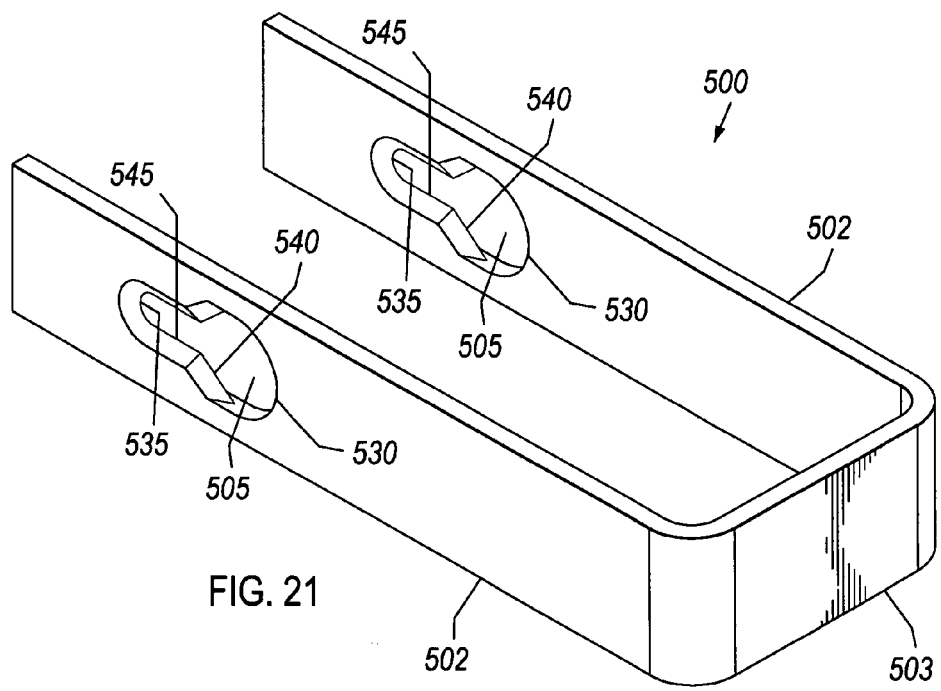
FIG. 21 is the first embodiment of the locking blade of an alternative embodiment.

Upper cover 305 also includes a pair of upper locking blade receiving slots 330 as shown in FIG. 20. Lower cover 306 includes a set of complementary lower locking blade receiving slots 331. The upper and lower locking blade receiving slots 330 and 331 and upper and lower button openings 313 and 314 cooperate to create a channel in which locking blade 500 and button 510 slidingly fit. FIGS. 19A and 19B best show the button 510. Button 510 includes a curved locking blade receiving slot 515 and a spring receiving slot 521. Locking blade 500, shown in isometric on FIG. 21 is a U-shaped metal piece, in the preferred embodiment, which can also be formed of a composite material or alloy.

Locking blade 500 includes two arms 502 and a top 503. In a preferred embodiment, both arms and the top are formed in one piece. Arms 502 have two clamp slots 505 which are placed in equal positions on both arms. Each clamp slot 505 is comprised of a first radius 530 and a second radius 535 placed at opposite ends of clamp slot 505. The length of the slot is determined by the travel of button 510 and locking blade 500. In the preferred embodiment the travel of button 510 and locking blade 500 is about 0.5. The first radius 530 and the second radius 535 are connected by an angular indention 540 and a locking surface 545 which create an angular step from the first radius 530 to the second radius 535. First radius 530 is larger than radius 535 by approximately thirty percent. In the preferred embodiment, the first radius is 0.093 inches and the second radius 0.037 inches. In the preferred embodiment, angular indention 540 makes an angle of thirty-four to thirty-six degrees from the long axis of the arm in which it is placed, but other angles will also function properly to accommodate different filament sizes. The purpose of the stair step locking surface 545 and angular indention 540 is to fit one or two filament sizes when the head is assembled.

Figure 22:
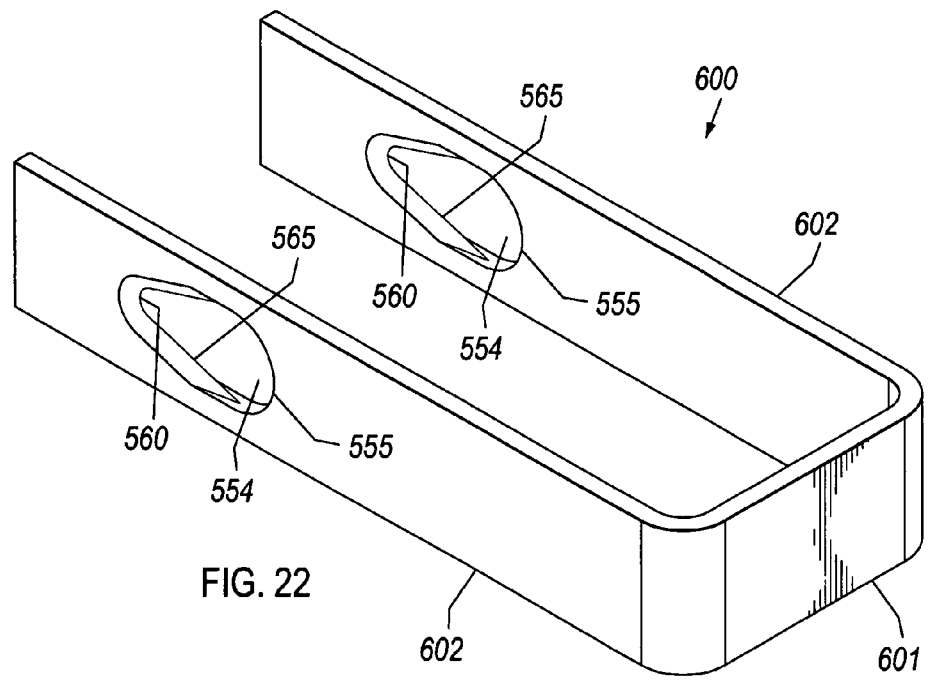
FIG. 22 is the second embodiment of the locking blade of an alternative embodiment.

In a different embodiment of locking blade 500 as shown in FIG. 22 has first alternative locking blade 600. The structure of first alternative locking blade 600 is identical to first locking blade 500 having arms 602 and a top 601, and cooperates with button 510 in an identical manner to that of locking blade 500 with the exception of the clamp slots. In first alternative locking blade 600, each arm 602 has an alternative clamp slot 554. Alternative clamp slot 554 includes a first radius of 555 and a second radius 560 joined by an angular locking surface 565. As will be seen in FIG. 22, angular locking surface 555 is a gradual slope unlike the stair step locking surface 545 of locking blade 500. In this preferred embodiment, the first and second radius 555 and 560 of first alternative locking blade 600 are the same as the first and second radius 530 and 535 of locking blade 500. The angle of the surface 565 in this preferred embodiment is twenty degrees, but other angles will function properly to accommodate the different filament sizes. The purpose of the alternative clamp slot 554 is to fit multiple filament sizes when the head is assembled.

Figure 23:
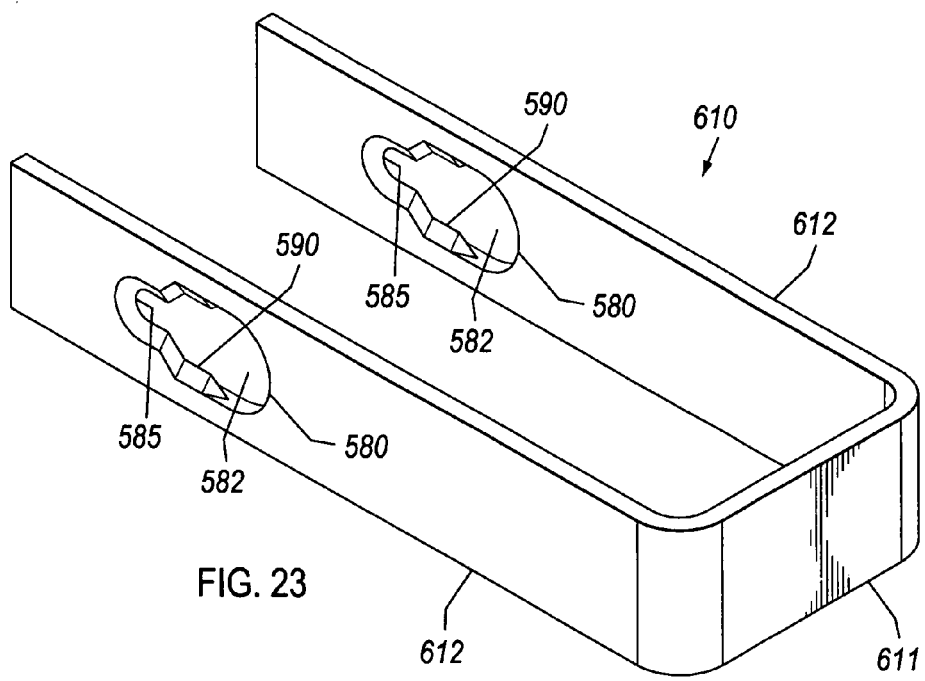
FIG. 23 is the third embodiment of the locking blade of an alternative embodiment.

In a further embodiment, shown in FIG. 23, a second alternative locking blade 610 has a top 611 and arms 612 in which are bored equi-distantly spaced second alternate clamp slots 582. Second alternate clamp slots 582 include a first radius 580 and a second radius 585 which are identical to the first embodiment 500. Second alternate locking blade 610 connects the two radii with a stair step locking surface 590 which includes a level equal to the first radius, a level equal to the second radius and a level intermediate the two. In this preferred embodiment, the angle connecting the stair steps is forty-five degrees and the lengths of the stair steps are equal. Other angles and lengths will function as well to accommodate different filament sizes. Its purpose is to fit two or three different filament sizes. Second alternate locking blade 610 cooperates with button 510 and spring 520 in an identical manner that of the locking blade 500.

When assembled, spring 520 shown in FIG. 19 fits in spring receiving slot 521 of button 510. The arms 502 of locking blade 500 slide into the upper and lower locking blade receiving slots 330 and 331. One end of spring 520 is placed against lower spring seat 318 and upper spring seat 317 when the unit is assembled and fits in spring receiver slot 521. Spring 520 biases the upper and lower spring seats 317 and 318 against button 510 forcing the shoulders 511 on button 510 against the insides of upper button opening 313 and lower button opening 314 when upper cover 305 and lower 306 are assembled. Each clamp slot 505 is placed in direct alignment with the channel formed by the cooperation of upper filament channel 308 and lower filament channel 304 when the head is assembled. The bias provided by spring 520 forces angular indentions 540 (or, in the alternative the angled locking surfaces 565 or the stair step locking surface 590) to engage the line fitted in the channel formed by lower and upper filament channels 304 and 308 and force it against the insides of arbor hole 410 (as will next be described) to prevent movement of the filament along its axis.

Referring to FIG. 18, the preferred embodiment of the head also includes an arbor 400 having a positioning seat 405, an arbor hole 410 flat, diametrically opposed faces 415, upper threaded hole 420 and lower threaded hole 425 (shown in phantom). When assembled, arbor 400 is placed in arbor hole 309 of upper cover 305 and directly above a center hole (not shown) in lower cover 306. When assembled, arbor positioning seat 405 fits snugly against arbor positioning shelf 326 on upper cover 305. Self-tapping and self-locking screw 551 fits through the center hole in lower cover 306 and into lower threaded hole 425 in arbor 400. Self-locking screw 551 in cooperation with lower threaded hole 425 hold the arbor snugly in place in lower arbor hole 310 with respect to its axis. In order to prevent rotation of the arbor, it is provided with two diametrically opposed faces 415. The arbor positioning seats cooperate with arbor positioning faces 328 and 329 in upper cover 305 and lower arbor positioning faces 328A and 329A when the head is assembled to prevent rotation of the arbor in the head. When assembled, arbor hole 410 is in direct alignment with the channel formed by lower filament channel 304 and upper filament channel 308. Arbor hole 410 is sized larger than the largest filament to be used in the head.

Figure 24:
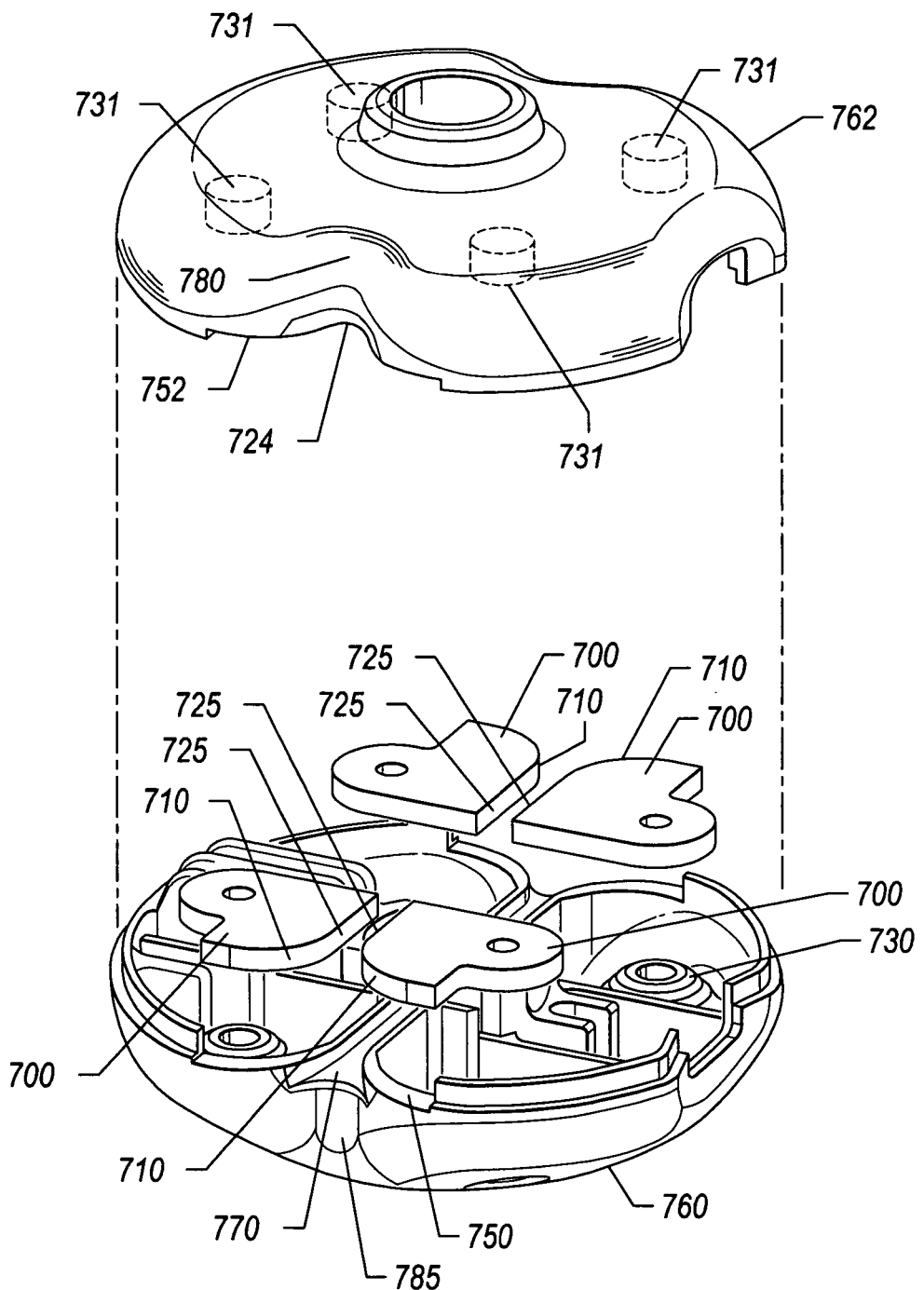
FIG. 24 is another alternative embodiment including metal inserts.

Another embodiment of the head is shown in FIG. 24. FIG. 24 differs from the embodiment shown in FIG. 18 by the addition of four metal inserts 700. Each metal insert 700 has a support hole 720, a wear surface 710 and an upper filament channel 724. Each metal insert fits in a lower insert seat 750 and upper insert seat 752 on lower cover 760 and upper cover 762, respectively when the covers are assembled. Each metal insert 700 is further supported by mating engagement with a lower stanchion 730 and are upper stanchion 731 (shown in phantom). Each metal insert 700 is sandwiched in between a lower stanchion 730 and its cooperating upper stanchion 731 when the head is assembled so that each metal insert is held firmly in place between the upper and lower stanchions and the lower and upper insert seats 750 and 752.

The four channel surfaces 725 on metal inserts 700 are positioned to form a part of the lower filament channel 770 in lower cover 760 and upper filament channel 724 in upper cover 762. The wear surfaces 710 of each of the metal inserts parallel the outside of lower curved surface 785 and upper curved surface 780 on each side of the head. When the head is assembled, the curved wear surfaces provide for long lasting wear surface for the filament and also prevents the filament from adhering to the side of the curved upper entry surface 780 and lower curved entry surface 785 on each side of the head.

When assembled, the operation of the unit is simple and intuitive. Button 510 extending through the upper and lower button openings 313 and 314 is depressed by the user compressing spring 520 and aligning upper and lower filament channels 308 and 304 with the first radii 530 of locking blade 500. A filament is placed into the filament channel through the clamp slots 505 and arbor hole 410 and positioned evenly with respect to the head. The user then releases button 510 which allows spring 520 to force button 510 radially outward, in turn moving locking blade 500 radially outward. Clamp slots 505 engage the filament and force it against the inside of arbor hole 410 clamping it securely against each angular indention 540 of clamp slot 505. One important feature of the invention is that each angular indention 540 of each clamp slot 505 engages the line at two distinct points. This minimal, yet secure engagement of the line in clamp slots 505 provides a maximum resistance to forces parallel to the axis of the line attempting to pull it from the head while not creating circumferential cuts on the filament which have a tendency to shear during operation requiring repeated replacement of the line.

The construction and operation of each of the embodiments is believed to be readily understandable to those of ordinary skill in the art based on the foregoing description.

Although preferred embodiments of the invention have been described in detail herein, those skilled in the art will recognize and understand that various modifications and substitutions may be made to the embodiments described without departing from the scope and spirit of the appended claims.

What is claimed is:

1. A line trimming head comprising: a housing; a central support fixed within the housing; the housing and the central support adapted to create a line channel; a gripper movable between first and second positions; the first position allowing the admittance of a filament through the channel; the second position providing for holding the filament in the channel; wherein the gripper comprises at least one locking blade; the locking blade having a clamp hole; the clamp hole cooperating with the channel to hold the filament when the gripper is in the second position.

2. The head of claim 1 wherein the clamp hole is a graduated circle.

3. The head of claim 1 wherein the clamp hole includes at least two radii and a graduated connecting surface.

4. The head of claim 1 wherein the clamp hole engages the filament in at least two discrete points.

5. The head of claim 1 wherein the clamp hole includes graduated steps.

6. The head of claim 1 wherein the gripper is metal.

7. The head of claim 1 wherein the housing is made of a thermoplastic material.

8. The head of claim 1 wherein the housing is made of a thermo setting plastic material.

9. The head of claim 1 wherein the housing is made of a composite material.

10. The head of claim 1 wherein the housing is made of a metal alloy.

11. The head of claim 1 wherein the housing is adapted to prevent rotation of the central support with respect to the head.

12. The head of claim 1 wherein the central support is adapted to attach to a line trimmer.

13. The head of claim 1 including a wear-resistant means adjacent to and in cooperation with the channel for reducing wear on the filament.

14. The head of claim 1 wherein the channel forms smooth exits for the filament.

15. The head of claim 14 wherein the smooth exits form surfaces of revolution with respect to the axis of rotation.

16. The head of claim 1 further comprising: a biasing means to bias the gripper in the second position.

17. The head of claim 16 wherein the biasing means is a coil spring.

18. The head of claim 1 wherein the central support includes a central support hole to create the channel.

19. The head of claim 18 wherein the clamp hole is positioned adjacent the central support hole; where the central support hole and the clamp hole align when the gripper is in the first position and offset when the gripper is in the second position.

20. The head of claim 1 wherein the channel forms a smooth exit at each side of the head.

21. The head of claim 20 wherein the smooth exit forms a surface of revolution with respect to the axis of the filament.

22. The head of claim 20 wherein the smooth exit is formed partially of a metal surface.

23. The head of claim 20 wherein the smooth exit is a radius of between 0.2 and 0.6 inches.

24. The head of claim 20 wherein the smooth exits form surfaces of revolution with respect to the long axis of the channel.

25. A line trimming head for a line trimmer comprising: a support shell; an axial attachment member rigidly supported in the shell and attached to the line trimmer; a radial channel in the shell and the axial attachment member adapted to receive a cutting line; a locking blade radially disposed generally perpendicularly to the radial channel having a clamp slot open to the radial channel; the locking blade slidable between a first position in which the cutting line may slide in the channel and a second position where the cutting line may not slide in the channel; and a spring to bias the locking blade in the second position.

26. The head of claim 25 wherein the radial channel is terminated at both sides of the shell in a smooth contour about the axis of the channel.

27. The head of claim 26 wherein the smooth contour is formed at least partially by a rigid non-plastic material.

28. The head of claim 26 wherein the smooth contour is formed at least in part of a metal material.

29. The head of claim 26 wherein the smooth contour is formed at least in part of a material which does not adhere to the cutting line.

30. The head of claim 26 wherein the smooth contour is of a radius of between 0.2 and 0.6 inches.

31. A line trimming head comprising: a housing; a central support fixed within the housing; the housing and central support adapted to create a line channel; a gripper movable between a first and second position; the first position allowing the admittance of a filament through the channel; the second position providing for holding the filament in the channel; and a plurality of strengthening counterweights diametrically opposed to the gripper.

32. The head of claim 31 wherein the counterweights are interlocking.

33. The head of claim 31 wherein the counterweights are integrally formed with the housing.

* * * * *